United States Patent Office 3,606,883
Patented Sept. 21, 1971

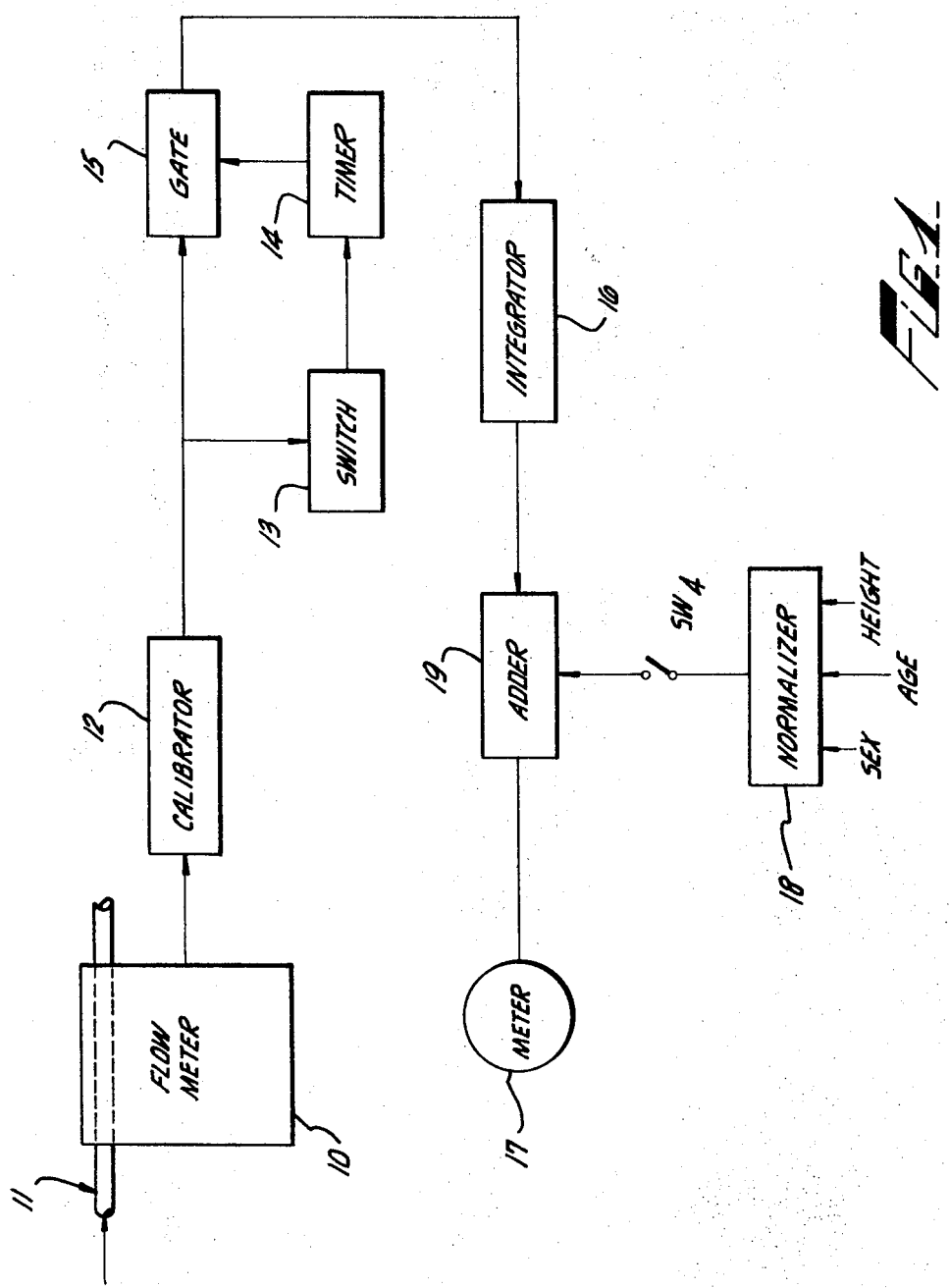

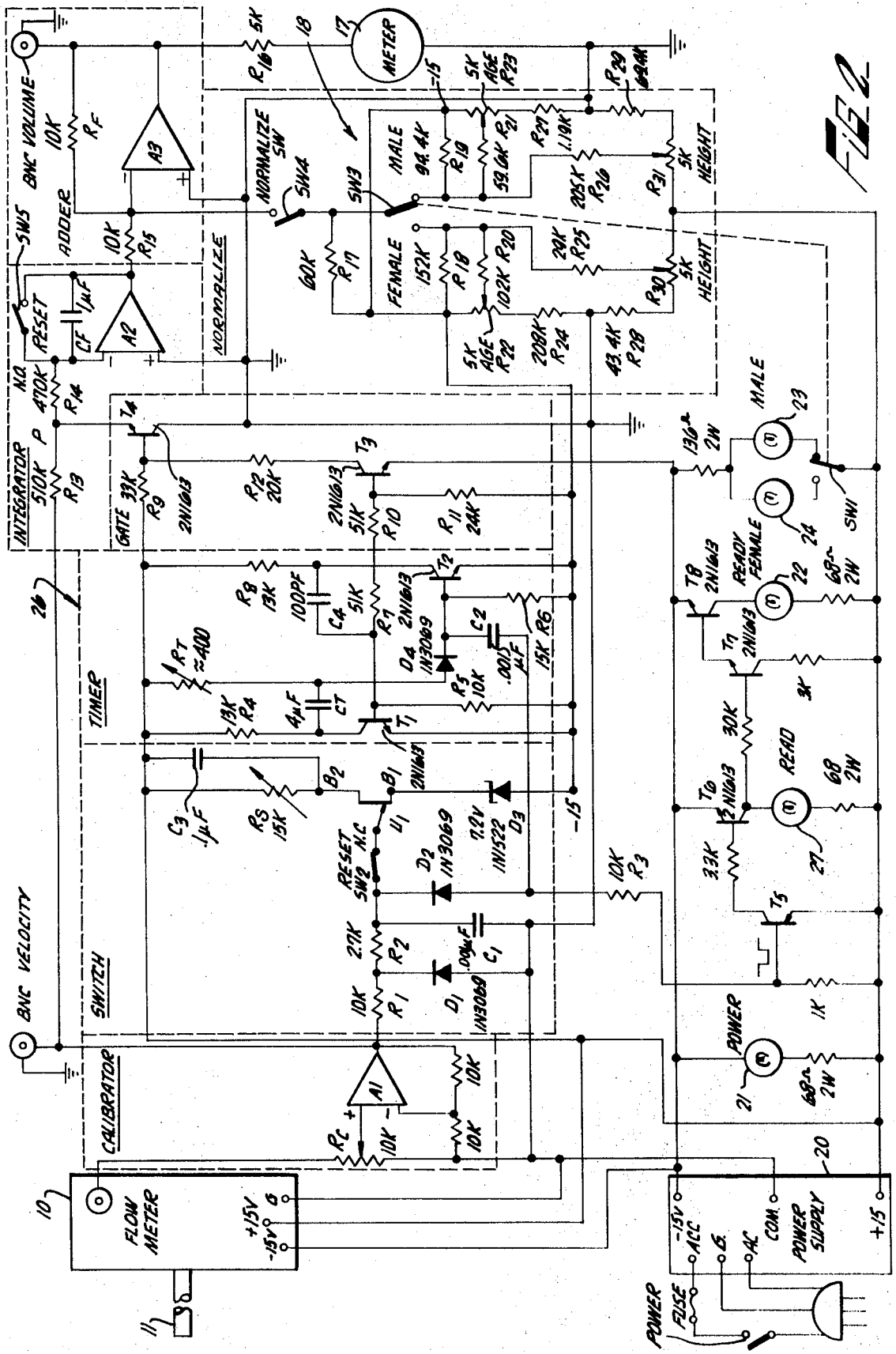

3,606,883
SPIROMETER WITH NORMALIZING MEANS
Kurt P. Poirier, Sacramento, and Paul A. Lux, South Gate, Calif., assignors to Sutter Hospitals Medical Research Foundation, Sacramento, Calif.
Filed Feb. 3, 1969, Ser. No. 796,055
Int. Cl. A61b 5/08
U.S. Cl. 128—2.08                                         6 Claims

ABSTRACT OF THE DISCLOSURE

A spirometer has a flowmeter for measuring the flow rate of air blown through a tube by a patient, and a calibrator for producing an electrical signal proportional to the volume per second of air expired. The electrical signal is detected by a switch which actuates a timer for holding a gate open for one second to apply the electrical signal to an integrator for one second to produce an output signal representing the volume of air expired by the patient in one second. A normalize circuit produces an output signal representing the volume of air expired in one second by a normal person having the same height, sex, and age as the patient. The output signals from the normalize circuit and the integrator are compared to produce a signal representing the patient's deviation from normal.

BACKGROUND OF THE INVENTION

This invention relates to a pulmonary function testing device and, more particularly, to an improved spirometer for measuring the volume of air expired by a patient in a given time interval.

A spirometer is especially useful in detecting respiratory diseases, particularly emphysema, because there is a high degree of correlation between the volume of air expired by a patient in a given time period and the presence or absence of obstructive lung diseases. Spirometers heretofore available have primarily used mechanical means, such as a bellows or a turbine, to measure air volume. These devices tend to preclude mass application of the spirometer because they are generally unreliable, and are too complex and costly to operate on a large scale. The means heretofore used to compare the patient's performance with that of a normal individual have been especially time consuming and expensive. The present invention is particularly useful in the mass screening of large populations because it uses a relatively simple electrical means for measuring air volume and interpreting the patient's performance. The invention measures forced expiratory volume rapidly and accurately, it resets instantaneously, and it quickly compares the patient's performance with that of a normal individual.

SUMMARY OF THE INVENTION

Briefly, the invention includes a flowmeter for measuring the flow rate of air that a patient blows through a tube. The flowmeter converts air velocity into a corresponding voltage signal, and this output signal is calibrated against a known source of air to give a preferred output signal of one volt equaling one liter per second of air passing through the flowmeter. This signal is then fed to an electronic switch, or gating circuit, which is driven by a timer operating at a timing interval of preferably one second. The timer is triggered by a threshold detector which puts out a pulse when the patient begins to blow through the tube. The timer holds a gate open for the first second that the patient blows through the tube. The signal through the gate is then fed to an integrator which gives an output equal to the volume of air expired during the one second interval. This volume is read on a front panel meter calibrated in liters. After the initial air volume reading has been obtained, the patient's performance can be compared with that of a normal individual. Adjustments are preferably made for the patient's sex, age and height, and these parameters are set on the front panel. An electrical summing device is then activated by pressing a button, and the patient's deviation from normal is read on a second meter on the front panel.

BRIEF DESCRIPTION OF THE DRAWING

These and other aspects of the invention will be more fully understood from the following detailed description and the accompanying drawings in which:

FIG. 1 is a simplified block diagram illustrating the functional operation of this invention; and FIG. 2 is a schematic circuit diagram of the apparatus of this invention.

DETAILED DESCRIPTION OF THE PREFERRED EMBODIMENT

Referring to FIG. 1, a flowmeter 10 measures the velocity of air that the patient blows through a tube 11. A calibrator 12 converts the flowmeter output signal into a voltage signal of one volt equaling one liter per second of expired air. The calibrated output is detected by a switch 13 which generates an output pulse which in turn fires a timer 14. During zero flow a gate 15 is closed and no output from the flowmeter enters an integrator 16. When the timer is activated, the gate is held open and the flowmeter output signal is fed to the integrator for one second. The integrator sums up the flow rate for each instant during the one second interval and gives an output reading in volume (in liters) which is read directly on a meter 17.

The patient's sex, age and height are input to a normalize circuit 18, which develops an appropriate signal for an electronic adder 19 which compares the patient's expired volume of air with that of a normal person. The patient's deviation from normal is then read on the meter.

The operation of this spirometer may be more clearly understood by referring to FIG. 2, which is a diagram of the presently preferred circuit used in the invention. A power supply 20 converts a conventional 110 volt AC current to +15 and −15 volts DC. When the power supply is operating, a power lamp 21 is on. Before the patient exhales, transistors $T_5$ and $T_6$ do not conduct. Transistors $T_7$ and $T_8$ normally conduct which causes a ready lamp 22 on the panel to remain on. Panel lamps 23 and 24 representing male and female, respectively, are on or off depending upon the setting of a selector switch SW–1.

The flowmeter 10 used to measure flow rate may be of any suitable type, preferably a conventional hot wire anemometer type, M 700–1, currently manufactured by Flow Corporation. The flow of air passing through the tube into the flowmeter cools a hot wire (not shown) thereby changing its resistance. This changes the current needed to keep the wire hot, and the change in current is a measure of air flow through the tube. The output of the flowmeter is a voltage signal corresponding to air flow through the tube at any time. The flowmeter output is fed to a first high-gain DC voltage amplifier $A_1$ and calibrated against a known source (not shown) of air so that one volt from the amplifier is equal to one liter per second of air passing over the hot wire. The calibration factor is set by adjusting a resistor $R_c$ which controls the gain of the first amplifier.

The output signal from the first amplifier is fed through resistors $R_1$ and $R_2$, and a first reset switch SW–2 to the emitter of a unijunction transistor (UJT) $U_1$ which has two bases $B_1$ and $B_2$. When the input signal to the UJT is below a certain set voltage (peak voltage) the UJT will not fire. But, if the input signal is above the peak voltage, the UJT fires, causing an output pulse which is used to trigger a timing circuit 26. The UJT is set to fire at 0.5 v.–0.6 v. relative to ground (corresponding to an airflow of 0.5 to 0.6 liter per second, since the flowmeter is calibrated to produce a voltage signal of one volt equalling a flow rate of one liter per second). This voltage is set by the value of resistor $R_2$ and the adjustment of a variable resistor $R_s$. A voltage output signal from the first amplifier $A_1$ increases the voltage across a capacitor $C_1$ until the emitter voltage of the UJT reaches the peak voltage. At this point the emitter of the UJT starts heavy current conduction from emitter to base $B_1$ through a diode $D_3$, causing the emitter of the UJT to switch to the $B_1$ voltage and remain there until the reset switch SW–2 is opened. The output of the UJT is a negative step which is applied through a diode $D_2$ and a coupling capacitor $C_2$ to the base of a transistor $T_2$, and which is of sufficient magnitude to trigger the timer circuit. The negative step output from the UJT also appears at the base of transistor $T_5$, thereby causing transistors $T_5$ and $T_6$ to conduct and turn on a read lamp 27. A negative step voltage is also applied to the base of transistor $T_7$ causing transistors $T_7$ and $T_8$ to turn off, thereby causing the read lamp 22 to turn off.

The timer circuit is a typical monostable multivibrator circuit which, upon being triggered, switches to its unstable state for a predetermined time before returning to steady state. Biasing resistors $R_6$ and $R_5$ hold transistor $T_2$ on and transistor $T_1$ off during stable state. When the negative step from the UJT is applied to the base of transistor $T_2$, transistor $T_2$ turns off and transistor $T_1$ turns on. Transistor $T_2$ remains off until a timing capacitor $C_t$ discharges through a variable timing resistor $R_t$. The circuit remains in its unstable condition until capacitor $C_t$ has discharged at which time the current flowing to the base of transistor $T_2$ causes the circuit to return to its stable condition, with transistor $T_2$ conducting and transistor $T_1$ at cutoff. The output of the timer circuit is a positive pulse applied to the base of a transistor $T_3$. The duration of the pulse is determined primarily by the time constant of capacitor $C_2$ and resistor $R_2$ during discharge, and in the present invention resistor $R_t$ is set so that discharge time equals one second.

The gating circuit 15 comprising transistor $T_3$ and $T_4$ in combination with their associated resistors controls the output signal from the first amplifier $A_1$ to the integrator 16. Normally, transistor $T_3$ is biased to cutoff. As a result, current flows through a resistor $R_9$ to the base of transistor $T_4$, thereby maintaining transistor $T_4$ continuously at saturation except for the one second interval of breath measurement. Because of the low emitter-to-collector resistance of transistor $T_4$ at saturation, any output signal from the first amplifier which causes current to flow in a resistor $R_{13}$ is effectively shorted to ground through transistor $T_4$. Therefore, while transistor $T_4$ is saturated, the gate represented by transistor $T_4$ is closed and voltage output signals from the first amplifier do not appear as an input to the integrator.

When the timer triggers the gating circuit, the positive pulse at the base of transistor $T_3$ turns transistor $T_3$ on for one second. This effectively shorts the current flowing to the base of transistor $T_4$ through resistor $R_9$, therefore causing transistor $T_4$ to cutoff for one second which, in effect, acts like an open switch between a point P and ground. Therefore, current flowing through resistor $R_{13}$ is fed to the integrator through a resistor $R_{14}$. Consequently, transistor $T_4$ acts as a gate by allowing the voltage output signal from the first amplifier to be fed to the integrating circuit for one second. After the signal is applied to the integrator for one second, transistor $T_2$ turns on, transistor $T_3$ turns off, and transistor $T_4$ returns to saturation, thereby shorting to ground any signals from the first amplifier.

The integrator circuit includes a second high-gain DC voltage amplifier $A_2$ with an input impedance resistor $R_{14}$ and a feedback capacitor $C_f$. Output voltage from the integrator varies with time according to the following relationship:

$$e_{out}(t) = -\frac{1}{R_{14}C_f}\int_0^{t=1 \text{ sec.}} e_{in}(t)dt \qquad (1)$$

$e_{in}(t)$ is the voltage signal from the first amplifier, and $1/R_{14}C_f$ is the change in gain generated by the integrator which also includes a phase inversion.

The integrator converts the signal from the first amplifier to a signal which is equivalent to the volume of air expired by the patient in one second. The signal from the integrator is stored in capacitor $C_f$ and fed to an electronic adder comprising a third high-gain DC voltage amplifier $A_3$ in combination with an input impedance resistor $R_{15}$ and a feedback resistor $R_f$. The output voltage from the third amplifier represents the number of liters expired by the patient in one second and is recorded directly on a meter 17.

After the initial reading of liters expired is obtained, the patient is compared with a normal person by activating the normalize circuit 18. The normalize circuit includes a network of resistors $R_{17}$ through $R_{31}$ connected as shown in FIG. 2 to form the male and female input impedances to the electronic adder. In the present invention, the impedance values are set to input the following information to the adder.

$$FEV_{1.0} = 0.073H - 0.021A - 0.99 \text{ (female)} \qquad (2)$$
$$FEV_{1.0} = 0.094H - 0.028A - 1.59 \text{ (male)} \qquad (3)$$

$FEV_{1.0}$ represents the volume of air a normal person is capable of expiring in one second, A is the patient's age, and H is his height.

Variable resistors $R_{22}$ and $R_{23}$ are set to correspond with the patient's age, and variable resistors $R_{30}$ and $R_{31}$ are set to correspond with the patient's height. The patient's sex is input by approximately adjusting switch SW–3 which is ganged to switch SW–1. After the foregoing adjustments are made, the patient's deviation from normal is determined by activating the normalize circuit. This is done by closing a switch SW–4 which causes the parameters of Equations 2 and 3 to be subtracted from the meter reading and a half-scale value added. Therefore, if the patient's performance is normal, the difference between his meter reading and $FEV_{1.0}$ is zero, and he has a meter reading at mid-scale. Reset switch SW–5 is then closed to discharge capacitor $C_f$, and reset switch SW–2 is opened to ready the spirometer for the next test.

With the spirometer of this invention, a patient can be checked in a few seconds, thus making it possible to screen many people at low cost. Moreover, the results are instantly available, eliminating the need to have the results interpreted at some time following the test, and eliminating unnecessary recording of a normal person's name and address with subsequent follow up.

We claim:
1. A spirometer comprising
   (a) transducer means for converting the flow rate of human breath into an electrical output signal,
   (b) an integrating circuit having an input and an output,
   (c) gate means having an open condition for connecting the transducer output signal to the integrating circuit input,
   (d) a timer circuit responsive to the transducer output signal for opening the gate means for a given time interval, the integrating circuit being operative to integrate the transducer output signal for the given time interval to produce an electrical output signal representative of the volume of human breath flowing through the transducer means during the time interval,

(e) a first normalizing circuit having adjustable input means adapted to be set in accordance with the physical characteristics of a patient, and means responsive to the setting of the input means for producing an electrical output signal representative of the volume of human breath produced in the given time interval by a normal person having the same physical characteristics as the patient, (f) a second normalizing circuit having adjustable input means adapted to be set in accordance with the physical characteristics of a patient, and means responsive to the setting of the input means for producing an electrical output signal representative of the volume of human breath produced in the given time interval by a normal person having the same physical characteristics as the patient, (g) means for comparing the output signal of the integrating circuit with one of the output signals of the first and second normalizing circuits, and for producing an output signal representative of said comparison, (h) adjustable means for coupling one of the output signals of the first and second normalizing circuits to the comparing means depending upon the sex of the patient, and (i) means for indicating the output signal of the comparing means.

2. Apparatus according to claim 1 which includes means for interrupting the connection between each normalizing circuit and the comparing means so the indicating means detects the output signal of the integrating circuit.

3. Apparatus according to claim 1 wherein the timer circuit includes means for opening the gate means in response to a minimum output signal from the transducer means.

4. Apparatus according to claim 1 wherein the comparing means includes an adder responsive to the output signal of the integrating circuit and the output signal of one of the normalizing circuits for producing an output signal representative of the algebraic difference between said output signals.

5. Apparatus according to claim 1 wherein the input means of the first and second normalizing circuits include means for adjusting the respective output signals of the normalizing circuits in response to the patient's age and height.

6. Apparatus according to claim 1 wherein:

(a) the first normalizing circuit has first input means adjusted according to the height of the patient, and second input means adjusted according to the age of the patient;

(b) the electrical output signal produced by the first normalizing circuit represents the volume of human breath produced by a normal female person, and the means for producing said output signal includes means for increasing the magnitude of said output signal as the height of the female patient increases, and means for decreasing the magnitude of said output signal as the age of the female patient increases;

(c) the second normalizing circuit has first input means adjusted according to the height of the patient, and second input means adjusted according to the age of the patient; and (d) the electrical output signal produced by the second normalizing circuit represents the volume of human breath produced by a normal male person, and the means for producing said output signal includes means for increasing the magnitude of said output signal as the height of the male patient increases, and means for decreasing the magnitude of said output signal as the age of the male patient increases.

References Cited

UNITED STATES PATENTS

| | | | |
|---|---|---|---|
| 3,082,761 | 3/1963 | Engelder | 128—2.08X |
| 3,156,235 | 11/1964 | Jaeger | 128—2.05M |
| 3,157,177 | 11/1964 | Smith | 128—2.05AS |
| 3,232,288 | 2/1966 | Krobath | 128—2.08 |
| 3,319,624 | 5/1967 | Arp et al. | 128—2.08 |
| 3,368,212 | 2/1968 | Klyce | 340—239 |
| 3,433,217 | 3/1969 | Rieke | 128—2.08 |

FOREIGN PATENTS

| | | | |
|---|---|---|---|
| 1,134,753 | 11/1968 | Great Britain | 128—2.08 |

OTHER REFERENCES

Hershberg, P. I., et al.: Amer. Journal of Med. Electronics, July-September 1963, pp. 207–211.

Krobath, H., et al.: Amer. Journal of Med. Electronics, April-June 1964, pp. 105–109.

RICHARD A. GAUDET, Primary Examiner

K. L. HOWELL, Assistant Examiner